US012647456B2

(12) United States Patent
Tong et al.

(10) Patent No.: US 12,647,456 B2
(45) Date of Patent: Jun. 2, 2026

(54) PREVENTION OF MAN-IN-THE-MIDDLE PHISHING

(71) Applicant: Palo Alto Networks, Inc., Santa Clara, CA (US)

(72) Inventors: Xunhua Tong, San Jose, CA (US); Suiqiang Deng, Fremont, CA (US); Oleksii Starov, Sunnyvale, CA (US); Lucas Hu, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 54 days.

(21) Appl. No.: 18/640,737

(22) Filed: Apr. 19, 2024

(65) Prior Publication Data

US 2025/0330491 A1 Oct. 23, 2025

(51) Int. Cl.
*H04L 29/06* (2006.01)
*H04L 9/40* (2022.01)

(52) U.S. Cl.
CPC ...... *H04L 63/1483* (2013.01); *H04L 63/1466* (2013.01)

(58) Field of Classification Search
CPC .................................................. H04L 63/1483
See application file for complete search history.

(56) References Cited

U.S. PATENT DOCUMENTS 10,999,322 B1 5/2021 Yuan
12,217,480 B1 2/2025 Karpman

| | | | |
|---|---|---|---|
| 12,413,620 B1 | 9/2025 | Dambra | |
| 2019/0014149 A1 | 1/2019 | Cleveland | |
| 2020/0358819 A1 | 11/2020 | Bowditch | |
| 2021/0344711 A1 | 11/2021 | Cleveland | |
| 2022/0377110 A1* | 11/2022 | N ........................ | G06F 21/6218 |
| 2024/0265114 A1* | 8/2024 | Lambotte .............. | G06F 21/566 |

FOREIGN PATENT DOCUMENTS

| | | |
|---|---|---|
| CN | 114448664 | 1/2024 |
| CN | 117935292 | 5/2024 |

OTHER PUBLICATIONS

Github—lindsey98, PhishIntention: Phishing Detection Through Webpage Intention, 2022.
Github, OpenGVLab/Siamese-Image-Modeling: [CVPR 2023], Implementation of Siamese Image Modeling for Self-Supervised Vision Representation Learning, pp. 1-4.
Hu et al., Meddler-in-the-Middle Phishing Attacks Explained, Dec. 21, 2022, pp. 1-15.

(Continued)

*Primary Examiner* — Wasika Nipa
(74) *Attorney, Agent, or Firm* — Van Pelt, Yi & James LLP

(57) ABSTRACT

Techniques for prevention of man-in-the-middle phishing are disclosed. In some embodiments, a system/process/computer program product for prevention of man-in-the-middle (MitM) phishing includes monitoring a session, wherein the session includes a request to access a website; evaluating a payload associated with the request to access the website using a MitM phishing profile to determine that the request to access the website matches at least in part the MitM phishing profile; and performing a remedial action in response to determining that the payload is associated with MitM phishing activity.

8 Claims, 16 Drawing Sheets

(56)           References Cited

OTHER PUBLICATIONS

Kondracki et al., Catching Transparent Phish: Analyzing and Detecting MITM Phishing Toolkits, CCS '21, Nov. 15-19, 2021, pp. 1-15.
Liu et al., Inferring Phishing Intention via Webpage Appearance and Dynamics: A Deep Vision Based Approach, Proceedings of the 31st USENIX Security Symposium, Aug. 10-12, 2022, pp. 1633-1650.
Walkowiak et al., Evaluation of Vector Embedding Models in Clustering of Text Documents, Proceedings of Recent Advances in Natural Language Processing, pp. 1304-1311.

* cited by examiner

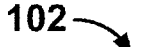
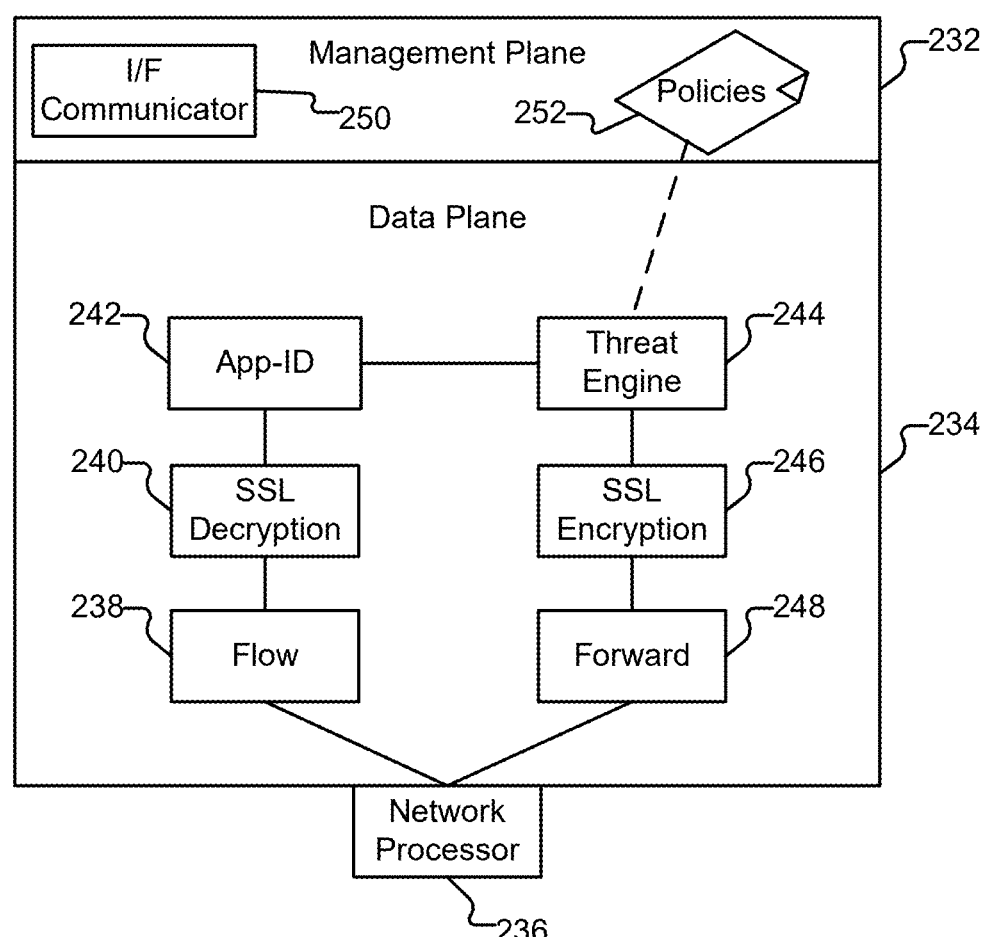
FIG. 2B

Traditional phishing:

404

Spoofed page

402 m1crosOft.com

Man-in-the-Middle phishing:

412 m1crosOft.com

414

Original page

410 microsoft.com

Original page

Source: https://catching-transparent-phish.github.io/

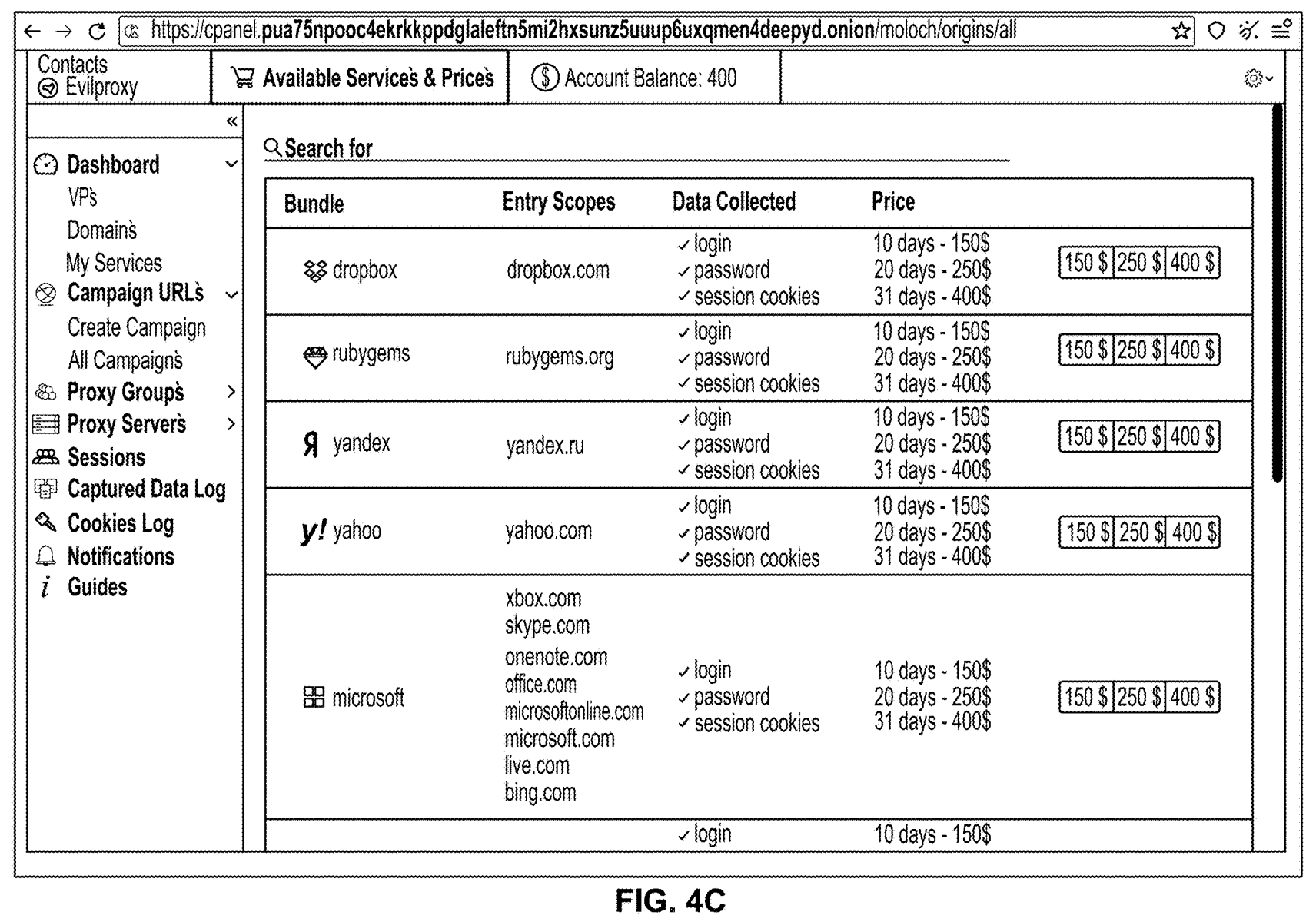

Contacts
Evilproxy https://cpanel.pua75npooc4ekrkkppdglaleftn5mi2hxsunz5uuup6uxqmen4deepyd.onion/moloch/origins/all Dashboard
VPs
Domains
My Services
Campaign URLs
Create Campaign
All Campaigns
Proxy Groups
Proxy Servers
Sessions
Captured Data Log
Cookies Log
Notifications
Guides Available Services & Prices    Account Balance: 400

Search for

| Bundle | Entry Scopes | Data Collected | Price | |
|---|---|---|---|---|
| dropbox | dropbox.com | ✓ login ✓ password ✓ session cookies | 10 days - 150$ 20 days - 250$ 31 days - 400$ | 150 $ 250 $ 400 $ |
| rubygems | rubygems.org | ✓ login ✓ password ✓ session cookies | 10 days - 150$ 20 days - 250$ 31 days - 400$ | 150 $ 250 $ 400 $ |
| yandex | yandex.ru | ✓ login ✓ password ✓ session cookies | 10 days - 150$ 20 days - 250$ 31 days - 400$ | 150 $ 250 $ 400 $ |
| yahoo | yahoo.com | ✓ login ✓ password ✓ session cookies | 10 days - 150$ 20 days - 250$ 31 days - 400$ | 150 $ 250 $ 400 $ |
| microsoft | xbox.com skype.com onenote.com office.com microsoftonline.com microsoft.com live.com bing.com | ✓ login ✓ password ✓ session cookies | 10 days - 150$ 20 days - 250$ 31 days - 400$ | 150 $ 250 $ 400 $ |
| | | ✓ login | 10 days - 150$ | |

FIG. 4C

Legitimate Payload: github.com

URL :https://github.com/login
ReqeustHeaders:
GET https://github.com/login HTTP/1.1
Accept: text/html,application/xhtml+xml,application/xml;q=0.9, image/webp, image/apng, */*;q=0.8,application/signed
-exchange; v=b3;q=0.9
Upgrade-Insecure-Requests: 1
Sec-Fetch-Dest: document
Sec-Fetch-Site: same-origin
Sec-Fetch-User: ?1
Accept-Encoding: gzip, deflate, br
Accept-Language: en-US
Sec-Fetch-Mode: navigate ResponseHeaders:
HTTP/1.1 200 OK
Server: GitHub.com
Date: Wed, 30 Nov 2022 23:38:09 GMT
Content-Type: text/html; charset=utf-8
Transfer-Encoding: chunked
Vary: X-PJAX, X-PJAX-Container, Turbo-Visit, Turbo-Frame
Cache-Control: no-store
ETag: W/"da8c2428fd6f49f86dc36aec5c6d4073"
Set-Cookie: _device_id=b8f7155be4b939df81f9379ccc04ed9a; path=/; expires=Thu, 30 Nov 2023 23:38:09 GMT; secure;
HttpOnly; SameSite Lax
Set-Cookie: _octo=GH1.1.267716121.1669851489; domain=_github.com; path=/; expires=Thu, 30 Nov 2023 23:38:09 GMT; secure;
SameSite-Lax
Set-Cookie: logged_in=no; domain=_github.com; path=/; expires=Thu, 30 Nov 2023 23:38:09 GMT; secure; HttpOnly; Same
Site-Lax
Set-Cookie: _gh_sess=D8dhY1%2BPJRC4oyXvEWYLBLwbPj6LLbwXEgKilBgJEPSCSPxyJFGa6xvPCyHcFMUIiyM8FwZ9ngoM
wi6cl4t4E3F5oB9cZhoSlfCKW0l%2FNCPBgcQ6e4Z5mGUmRsuWKfXEgqW%2F17PBu0%2FIGbgyxNTYUWAyuk9zMITTnwqW
J5g%2FmwR3e4T2%2BM6KCEDZeowce0s9FvAdNHnlj5aYHxHUBdGl1jZy4hPVxoz3WU2mjnaQIxiUVGJCaRk0FEKatwvKiKzp
B6ULJ67nlybuMN8%2BuCb4MQ%3D%3D--EYhvV47j0HCghQ5z--8z%2BFaNKFnGhbhc4Myiv08g%3D%3D; path=/; secure;
HttpOnly; SameSite=Lax

FIG. 6A

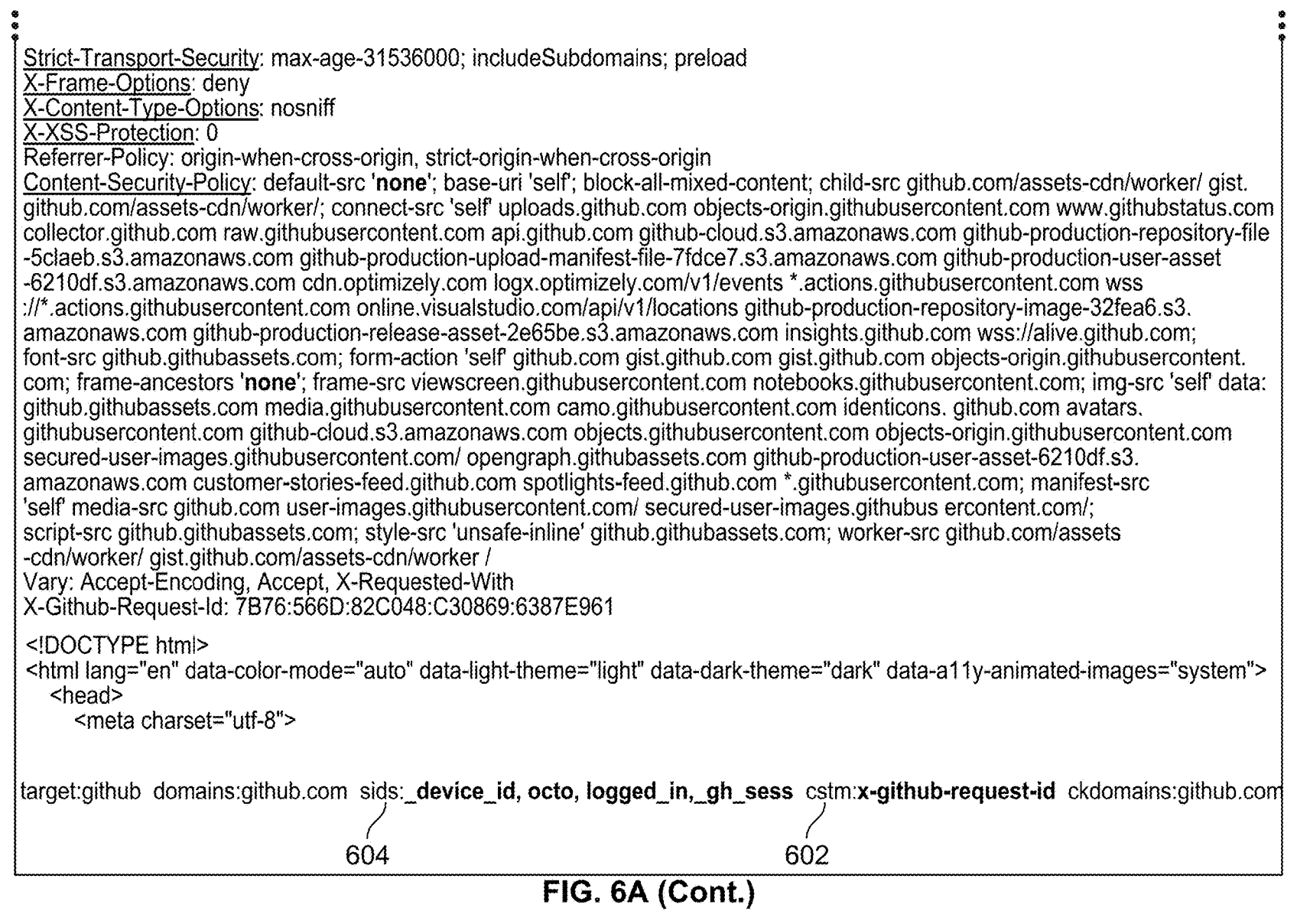

Strict-Transport-Security: max-age-31536000; includeSubdomains; preload
X-Frame-Options: deny
X-Content-Type-Options: nosniff
X-XSS-Protection: 0
Referrer-Policy: origin-when-cross-origin, strict-origin-when-cross-origin
Content-Security-Policy: default-src 'none'; base-uri 'self'; block-all-mixed-content; child-src github.com/assets-cdn/worker/ gist.
github.com/assets-cdn/worker/; connect-src 'self' uploads.github.com objects-origin.githubusercontent.com www.githubstatus.com
collector.github.com raw.githubusercontent.com api.github.com github-cloud.s3.amazonaws.com github-production-repository-file
-5claeb.s3.amazonaws.com github-production-upload-manifest-file-7fdce7.s3.amazonaws.com github-production-user-asset
-6210df.s3.amazonaws.com cdn.optimizely.com logx.optimizely.com logx.optimizely.com/api/v1/events * .actions.githubusercontent.com wss
://* .actions.githubusercontent.com online.visualstudio.com/api/v1/locations github-production-repository-image-32fea6.s3.
amazonaws.com github-production-release-asset-2e65be.s3.amazonaws.com insights.github.com wss://alive.github.com;
font-src github.githubassets.com; form-action 'self' github.com gist.github.com objects-origin.githubusercontent.
com; frame-ancestors 'none'; frame-src viewscreen.githubusercontent.com notebooks.githubusercontent.com; img-src 'self data:
github.githubassets.com media.githubusercontent.com camo.githubusercontent.com identicons. github.com avatars.
githubusercontent.com github-cloud.s3.amazonaws.com objects.githubusercontent.com objects-origin.githubusercontent.com
secured-user-images.githubusercontent.com/ opengraph.githubassets.com github-production-user-asset-6210df.s3.
amazonaws.com customer-stories-feed.github.com spotlights-feed.github.com * .githubusercontent.com; manifest-src
'self' media-src github.com user-images.githubusercontent.com/ secured-user-images.githubus ercontent.com/;
script-src github.githubassets.com; style-src 'unsafe-inline' github.githubassets.com; worker-src github.com/assets
-cdn/worker/ gist.github.com/assets-cdn/worker /
Vary: Accept-Encoding, Accept, X-Requested-With
X-Github-Request-Id: 7B76:566D:82C048:C30869:6387E961

<!DOCTYPE html>
<html lang="en" data-color-mode="auto" data-light-theme="light" data-dark-theme="dark" data-a11y-animated-images="system">
  <head>
    <meta charset="utf-8"> target.github domains:github.com sids:_ device_id, octo, logged_in,_gh_sess cstm x-github-request-id ckdomains:github.com 604            602

FIG. 6A (Cont.)

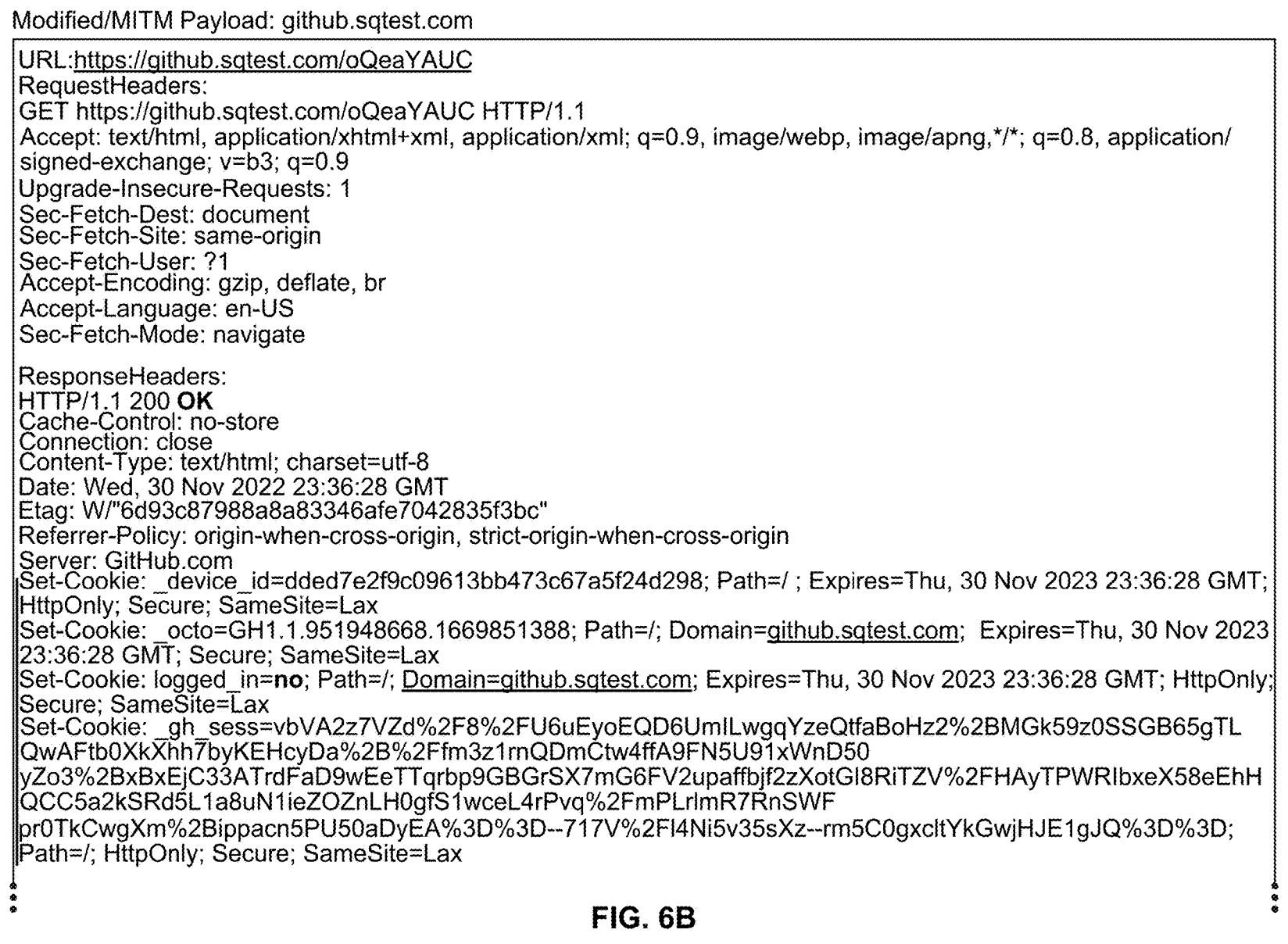

Modified/MITM Payload: github.sqtest.com

URL:https://github.sqtest.com/oQeaYAUC
RequestHeaders:
GET https://github.sqtest.com/oQeaYAUC HTTP/1.1
Accept: text/html, application/xhtml+xml, application/xml; q=0.9, image/webp, image/apng,*/*; q=0.8, application/
signed-exchange; v=b3; q=0.9
Upgrade-Insecure-Requests: 1
Sec-Fetch-Dest: document
Sec-Fetch-Site: same-origin
Sec-Fetch-User: ?1
Accept-Encoding: gzip, deflate, br
Accept-Language: en-US
Sec-Fetch-Mode: navigate ResponseHeaders:
HTTP/1.1 200 OK
Cache-Control: no-store
Connection: close
Content-Type: text/html; charset=utf-8
Date: Wed, 30 Nov 2022 23:36:28 GMT
Etag: W/"6d93c87988a8a83346afe7042835f3bc"
Referrer-Policy: origin-when-cross-origin, strict-origin-when-cross-origin
Server: GitHub.com
Set-Cookie: _device_id=dded7e2f9c09613bb473c67a5f24d298; Path=/; Expires=Thu, 30 Nov 2023 23:36:28 GMT;
HttpOnly; Secure; SameSite=Lax
Set-Cookie: octo=GH1.1.951948668.1669851388; Path=/; Domain=github.sqtest.com; Expires=Thu, 30 Nov 2023
23:36:28 GMT; Secure; SameSite=Lax
Set-Cookie: logged_in=no; Path=/; Domain=github.sqtest.com; Expires=Thu, 30 Nov 2023 23:36:28 GMT; HttpOnly;
Secure; SameSite=Lax
Set-Cookie: _gh_sess=vbVA2z7VZd%2F8%2FU6uEyoEQD6UmILwgqYzeQtfaBoHz2%2BMGk59z0SSGB65gTL
QwAFtb0XkXhh7byKEHcyDa%2B%2Ffm3z1mQDmCtw4ffA9FN5U91xWnD50
yZo3%2BxBxEjC33ATrdFaD9wEeTTqrbp9GBGrSX7mG6FV2upaffbjf2zXofGl8RiTZV%2FHAyTPWRIbxeX58eHH
QCC5a2kSRd5L1a8uN1ieZOZnLH0gfS1wceL4rPvq%2FmPLrlmR7RnSWF
pr0TkCwgXm%2Bippacn5PU50aDyEA%3D%3D--717V%2FI4Ni5v35sXz--rm5C0gxcItYKGwjHJE1gJQ%3D%3D;
Path=/; HttpOnly; Secure; SameSite=Lax

FIG. 6B

Figure 6B:
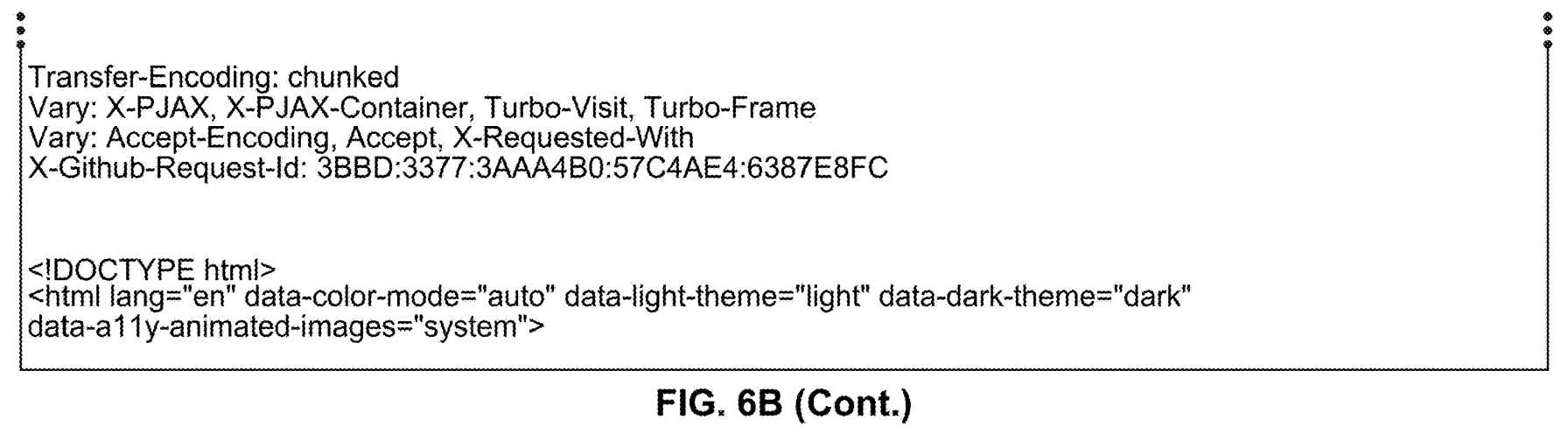

```
Transfer-Encoding: chunked
Vary: X-PJAX, X-PJAX-Container, Turbo-Visit, Turbo-Frame
Vary: Accept-Encoding, Accept, X-Requested-With
X-Github-Request-Id: 3BBD:3377:3AAA4B0:57C4AE4:6387E8FC <!DOCTYPE html>
<html lang="en" data-color-mode="auto" data-light-theme="light" data-dark-theme="dark"
data-a11y-animated-images="system">
```

Figure 7:
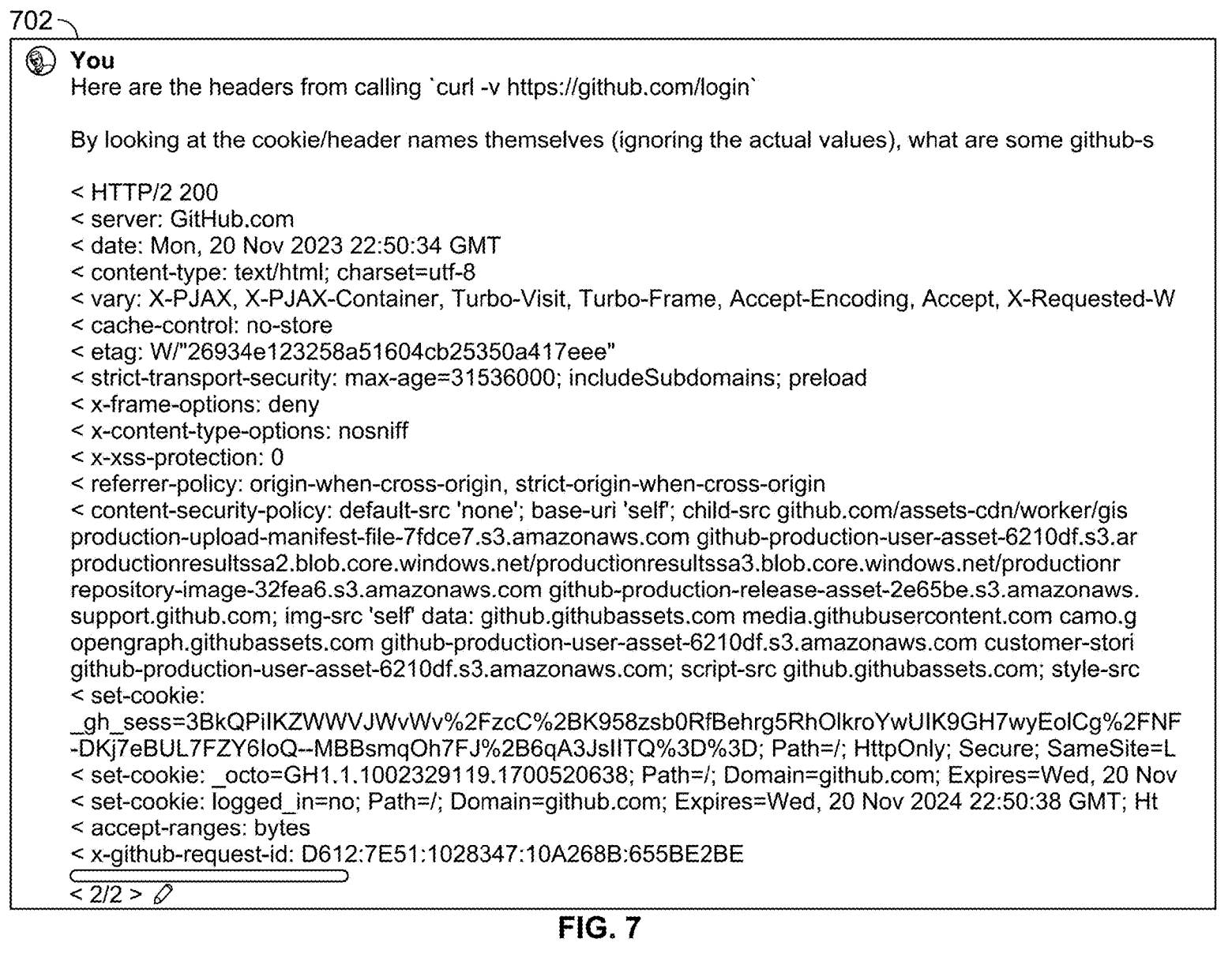

You

Here are the headers from calling `curl -v https://github.com/login`

By looking at the cookie/header names themselves (ignoring the actual values), what are some github-s < HTTP/2 200
< server: GitHub.com
< date: Mon, 20 Nov 2023 22:50:34 GMT
< content-type: text/html; charset=utf-8
< vary: X-PJAX, X-PJAX-Container, Turbo-Visit, Turbo-Frame, Accept-Encoding, Accept, X-Requested-W
< cache-control: no-store
< etag: W/"26934e123258a51604cb25350a417eee"
< strict-transport-security: max-age=31536000; includeSubdomains; preload
< x-frame-options: deny
< x-content-type-options: nosniff
< x-xss-protection: 0
< referrer-policy: origin-when-cross-origin, strict-origin-when-cross-origin
< content-security-policy: default-src 'none'; base-uri 'self'; child-src github.com/assets-cdn/worker/gis
production-upload-manifest-file-7fdce7.s3.amazonaws.com github-production-user-asset-6210df.s3.ar
productionresultssa2.blob.core.windows.net/productionresultssa3.blob.core.windows.net/productionr
repository-image-32fea6.s3.amazonaws.com github-production-release-asset-2e65be.s3.amazonaws.
support.github.com; img-src 'self' data: github.githubassets.com media.githubusercontent.com camo.g
opengraph.githubassets.com github-production-user-asset-6210df.s3.amazonaws.com customer-stori
github-production-user-asset-6210df.s3.amazonaws.com; script-src github.githubassets.com; style-src
< set-cookie:
_gh_sess=3BkQPiIKZWWVJWvWv%2FzcC%2BK958zsb0RfBehrg5RhOlkroYwUIK9GH7wyEolCg%2FNF
-DKj7eBUL7FZY6loQ--MBBsmqOh7FJ%2B6qA3JslITQ%3D%3D; Path=/; HttpOnly; Secure; SameSite=L
< set-cookie: _octo=GH1.1.1002329119.1700520638; Path=/; Domain=github.com; Expires=Wed, 20 Nov
< set-cookie: logged_in=no; Path=/; Domain=github.com; Expires=Wed, 20 Nov 2024 22:50:38 GMT; Ht
< accept-ranges: bytes
< x-github-request-id: D612:7E51:1028347:10A268B:655BE2BE

ChatGPT

From the headers provided in your `curl` request to `https://github.com/login`, there are a few GitHub-specific custom cookies and headers that can be used to identify the response as originating from GitHub:

1. Cookie Names:

- `_gh_sess`: This appears to be a session cookie specific to GitHub, as indicated by the prefix `_gh_`, which likely stands for "GitHub session".

- `_octo`: This cookie, with its name starting with `_octo`, is likely unique to GitHub, possibly related to user tracking or session management.

- `logged_in`: While the name of this cookie is somewhat generic, its presence in the context of other GitHub-specific cookies and its domain setting for `github.com` indicate it's specific to GitHub's login state management.

2. Custom Headers:

- `server: GitHub.com`: The server header explicitly mentions "GitHub.com," which is a direct indication of the source.

- `x-github-request-id`: This header, prefixed with `x-github`, is a custom header used by GitHub for tracking individual requests.

These cookies and headers are good indicators that the HTTP response originated from GitHub. The specific naming conventions and domain settings in the cookies, along with the unique custom headers, help in identifying GitHub as the source of the response.

FIG. 7 (Cont.)

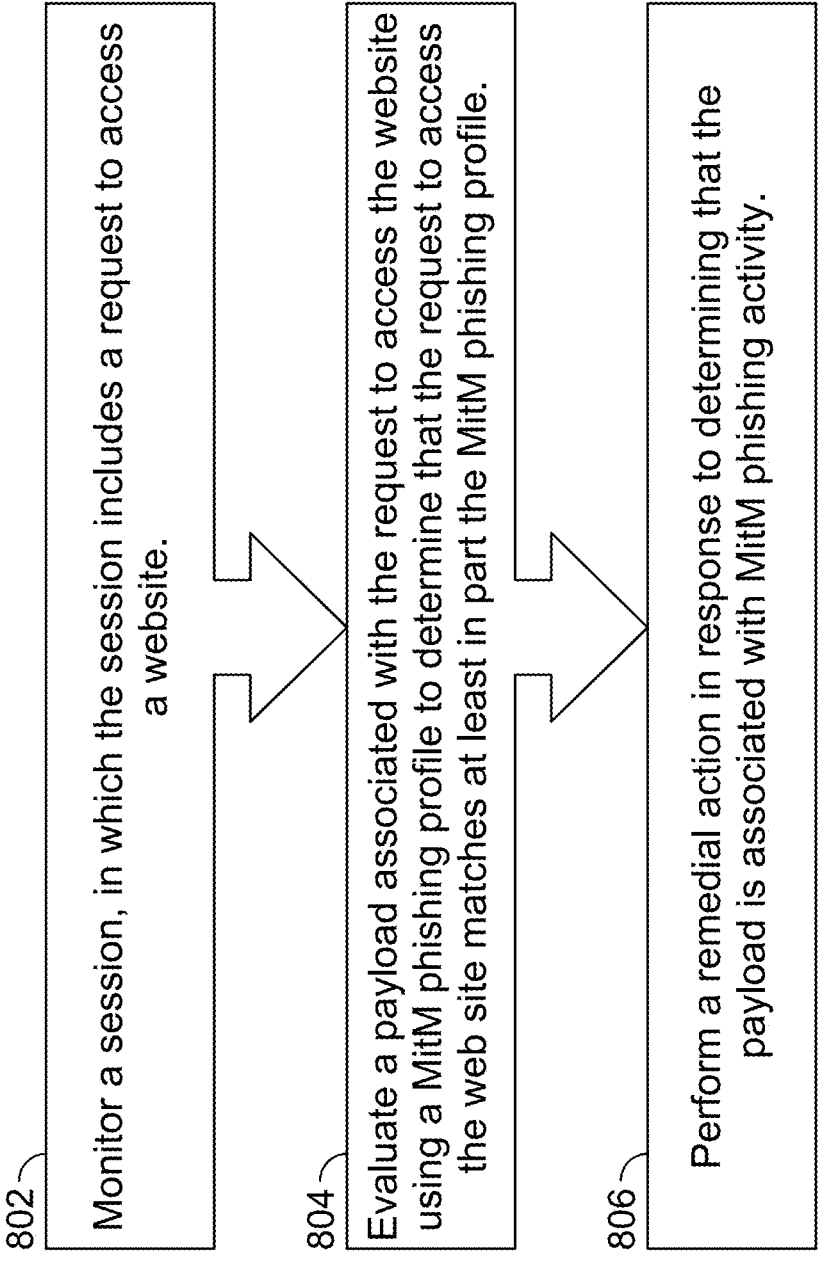

802 ⌐ Monitor a session, in which the session includes a request to access a website.

804 ⌐ Evaluate a payload associated with the request to access the website using a MitM phishing profile to determine that the request to access the web site matches at least in part the MitM phishing profile.

806 ⌐ Perform a remedial action in response to determining that the payload is associated with MitM phishing activity.

FIG. 8

902 — Monitor web related traffic.

904 — Extract a plurality of attributes from a response associated with the monitored web related traffic.

906 — Determine whether the extracted attributes are associated with a MitM phishing attack.

908 — Perform a responsive action based on a policy.

PREVENTION OF MAN-IN-THE-MIDDLE PHISHING

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 2B is a functional diagram of logical components of an embodiment of a data appliance.

FIG. 4C illustrates an example MitM phishing kit dashboard.

FIGS. 6A and 6B illustrate an example use case for applying detection of MitM attacks in accordance with some embodiments.

FIG. 7 illustrates training of a Large Language Model (LLM) for performing automated MitM phishing detection in accordance with some embodiments.

FIG. 8 is a flow diagram for prevention of MitM phishing in accordance with some embodiments.

DETAILED DESCRIPTION

Figure 1:
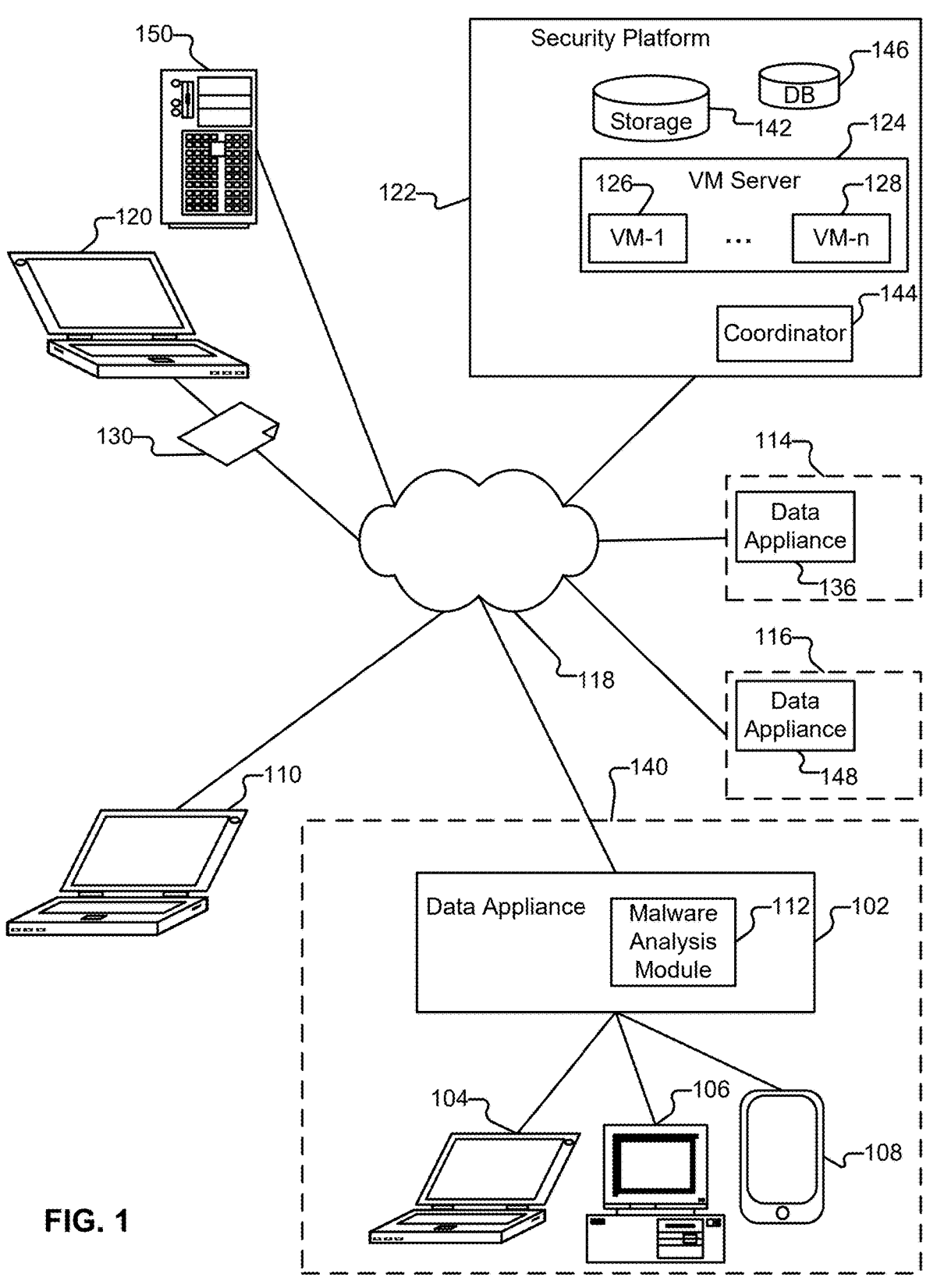
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges With Detecting Phishing Attacks

Internet users are under constant attack from cybercriminals. One type of attack is a phishing attack, where the ultimate goal of the attacker is to steal information from the user, such as a social security account number or banking credentials. Unfortunately, as techniques are developed to identify and prevent existing phishing attacks, new attacks are ever emerging, for which existing protections are insufficient. Therefore, an ongoing need exists to detect and mitigate such attacks.

Common phishing attacks have typically relied on creating HTML templates. However, building spoofed HTML templates requires time and effort for attackers to generate. Most work is spent on attempting to make the spoofed HTML templates appear similar enough to the target web pages to potentially trick users, as well as being responsive on mobile devices and/or properly obfuscated to evade existing phishing detection scanners.

However, phishing attacks are evolving and becoming more sophisticated. These evolving phishing attacks present new technical challenges in effectively and efficiently detecting such phishing attacks.

Specifically, Man-in-the-Middle (MitM) (e.g., also sometimes referred to as Meddler-in-the-Middle, Adversary-in-the-Middle, etc.) phishing pages/websites are different from traditional phishing pages, because MitM phishing pages/websites do not host any actual phishing content of their own. Rather, they relay the content from the legitimate website (e.g., github.com or another legitimated website targeted by the MitM phishing attack) to the user (e.g., victim user), and then the MitM attacker intercepts any credentials that are communicated over the network (e.g., the Internet). Given that the content of the MitM phishing page is exactly the same as the content of the legitimate page/website content, it is technically challenging to use content-based methods to detect MitM phishing pages/websites.

Thus, new and improved techniques for detecting phishing are needed.

Overview Of Techniques for Prevention Of Man-in-the-Middle Phishing

Accordingly, new and improved solutions for prevention of man-in-the-middle phishing are disclosed with respect to various embodiments.

In some embodiments, a system/process/computer program product for inline prevention of man-in-the-middle (MitM) phishing includes monitoring a session, wherein the session includes a request to access a website; evaluating a payload associated with the request to access the website using a MitM phishing profile to determine that the request to access the website matches at least in part the MitM phishing profile; and performing a remedial action in response to determining that the payload is associated with MitM phishing activity. For example, the disclosed techniques for prevention of MitM phishing can be applied inline and/or offline.

In an example implementation, the HTTP response headers are automatically analyzed to detect a man-in-the-middle (MitM) phishing attack. In this example implementation, detecting a MitM phishing attack is performed using a two stage approach (e.g., two stage MitM phishing detection logic), which can be implemented using a security platform (e.g., a firewall, such as a Network Gateway Firewall (NGFW), or another form of security platform) to provide inline detection of MitM phishing attacks using the techniques disclosed herein.

At a first stage, the security platform is configured to monitor the headers and cookie names being set in an HTTP response to identify a target brand (e.g., GitHub or another brand that has a website that may be targeted by MitM attackers). Specifically, in this first stage, we are attempting to determine the following: if this were a MitM phishing page (e.g., web page), what brand would it be targeting. For example, if the cookies that are set include "_device_id," "_octo," and "gh_sess;" and there is a special header called "x-github-request-id;" then it can be automatically determined that the target brand of the potential MitM phishing attack is GitHub.

At a second stage, after identifying the target brand, the security platform is configured to perform further investigation on the HTTP headers to determine whether the HTTP response is associated with a legitimate page or a MitM phishing page. As a first check, the "Set-Cookie" header is analyzed to verify that it is set to the legitimate domain for the target brand (e.g., in this example, ".github.com"). As a second check, the security-related HTTP headers are analyzed to ensure that they are properly set (e.g., Strict-Transport-Security and Content-Security-Policy settings verification). The second check can further include verifying that the request URL domain is legitimate (e.g., in this example, "github.com") as well as the "Server" header indicates the Web server the legitimate site uses.

It has been observed, based on our experiments, that for security reasons, legitimate applications (e.g., pages/websites) generally use a set of security-related headers to protect their content-loading and prevent cross-site scripting, etc. However, MitM attackers typically remove those headers so the page can load successfully on the illegitimate domain.

As such, in this example implementation, if the domain is not legitimate, and the security-related headers are not set, then the security platform can automatically determine that the HTTP response is associated with a MitM phishing attack.

Specifically, in this example implementation, the two stage logic as described above can be effectively and efficiently deployed in an inline phishing detection solution, such as Advanced Uniform Resource Link (URL) filtering (e.g., implemented in a security platform, such as an NGFW). As such, if the two stage MitM phishing detection logic is triggered, then the inline phishing detection solution can be configured to (e.g., based on a security policy, such as MitM phishing detection rules/policies) block such MitM phishing pages/websites in, for example, real-time, such as before such MitM phishing pages/websites can load in a victim user's browser (e.g., web browser executed on the victim user's endpoint device, such as a smart phone, laptop computer, etc.).

As such, the disclosed techniques for prevention of man-in-the-middle phishing facilitate a content agnostic solution for MitM phishing detection as the disclosed detection techniques do not require analysis of the actual content of the web page content (i.e., the actual HTML of the page). As such, the disclosed techniques are not subject to failure due to being unable to distinguish (e.g., being fooled by) legitimate-seeming content of, for example, a spoofed web page of a phishing site.

Moreover, the disclosed techniques for prevention of man-in-the-middle phishing are MitM phishing kit agnostic. For example, based on experiments, the disclosed techniques for MitM phishing detection effectively detected MitM phishing that were based on several different MitM phishing kits in the wild (e.g., Evilginx, Muraena, Evil-Proxy, etc.). Specifically, the disclosed techniques for MitM phishing detection were capable of detecting attacks hosted by each of these example MitM phishing kit platforms. More specifically, each of these kits generally performs similar modifications to the HTTP headers in order for the page to load, and the disclosed techniques include detecting these modifications to the HTTP headers in the HTTP response as will be further described below.

In addition, the disclosed techniques for prevention of man-in-the-middle phishing facilitate a low latency MitM phishing detection solution. For example, the above-described two stage MitM phishing detection logic can be performed fast enough to be executed inline without affecting the user's web browsing experience. As such, the disclosed techniques can be effectively and efficiently implemented to facilitate inline MitM phishing detection (e.g., using URL filtering executed on an inline security platform) as similarly described above and as will be further described below.

Further, the disclosed techniques for prevention of man-in-the-middle phishing facilitate an interpretable MitM phishing detection solution. For example, the disclosed techniques for MitM phishing detection can identify the specific brand being targeted in the MitM phishing attack (e.g., which allows security analysts/vendors to research trends in certain target brands over time).

In addition, the disclosed techniques for prevention of man-in-the-middle phishing facilitate an automated MitM phishing detection solution. For example, the disclosed techniques for MitM phishing detection facilitate an efficient mechanism for expanding coverage for a new brand. Specifically, a set of "identifier" cookie names and special headers can be identified for the new brand, and the legitimate domain associated with the new brand (e.g., collectively, a set of attributes associated with the brand's website, which can be included in a MitM phishing profile for the brand). The process for identification of the attributes (e.g., which can be included in a MitM phishing profile for the brand) associated with the brand's website is potentially semi-automatable.

As a first example implementation for expanding coverage for a new brand, if the cookie/header names are treated as tokens, term-frequency inverse-document-frequency (TF-IDF) (e.g., a technique that is often used in NLP to identify the most characteristic tokens in a document) can be applied to automatically identify a combination of cookie/header names that characterize a new brand (e.g., and in some cases, a manual review can also be further performed after these candidate cookie/header names are identified to verify these attributes associated with the brand's website, such as based on a MitM phishing profile for the brand).

As a second example implementation for expanding coverage for a new brand, various machine learning techniques can be applied, such as training and applying a Large Language Model (LLM) (e.g., using ChatGPT from OpenAI or another commercially available or open source LLM solution) to automate the profiling for different brands and/or updating the profiling to identify these attributes associated with each different brand's website (e.g., which can be included in a MitM phishing profile for the brand), such as will be further described below.

In an example implementation, the disclosed techniques for prevention of MitM phishing can further include use of additional signals, such as the reputation of the destination domain and destination IP, and/or the age of the destination domain. As another example, additional signals can be used as a prefilter for triggering the disclosed inline MitM analysis.

Furthermore, the disclosed techniques for prevention of man-in-the-middle phishing facilitate a robust MitM phishing solution. For example, the disclosed techniques for MitM phishing detection effectively and efficiently detect all HTTP-proxy based man-in-the-middle phishing kits (e.g., Evilginx, Muraena, EvilProxy, etc. based on our experiments as discussed above). Moreover, the disclosed MitM phishing detection logic analyzes core functionality (e.g., key headers, cookies) that cannot easily be manipulated by attackers.

Also, the disclosed techniques for prevention of man-in-the-middle phishing facilitate a highly accurate MitM phishing detection solution. For example, the disclosed MitM phishing detection techniques result in a very low false positive rate compared with existing network-based approaches. Based on experiments, the disclosed techniques can be applied to detect, for example, at least one thousand MitM phishing URLs per month.

Accordingly, new and improved security solutions that utilize prevention of man-in-the-middle phishing are disclosed in accordance with some embodiments. Moreover, the disclosed techniques for prevention of MitM phishing can be applied inline and/or offline.

These and other embodiments and examples for prevention of man-in-the-middle phishing will be further described below.

Example System Embodiments for Prevention Of Man-in-the-Middle Phishing

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) which, for example, can be provided in part or in whole as a SASE security solution, in which the cloud-based security solution (e.g., SASE) can be monitored using the disclosed techniques for an application access analyzer, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
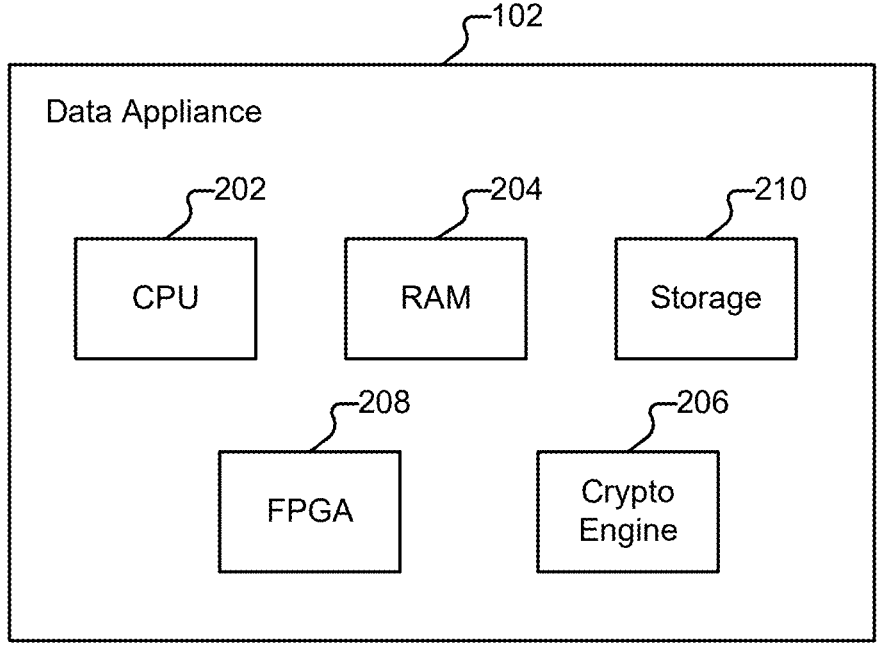
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for a malicious web campaign (e.g., the malware can be delivered to endpoint devices of users via a compromised website when the user visits/browses to the compromised website or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/ C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

As shown, data appliance 102 includes a malware analysis module 112. In an example implementation, malware analysis module 112 performs inline detection of MitM phishing attacks. In this example implementation, the malware analysis module implements the disclosed two state MitM phishing detection logic as similarly described above and further described below with respect to various embodiments.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

A variety of actions can be taken by data appliance 102 if no signature for an attachment is found, in various embodiments. As a first example, data appliance 102 can fail-safe, by blocking transmission of any attachments not allow-listed as benign (e.g., not matching signatures of known good files). A drawback of this approach is that there may be many legitimate attachments unnecessarily blocked as potential malware when they are in fact benign. As a second example, data appliance 102 can fail-danger by allowing transmission of any attachments not block-listed as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). The subscription can cover the analysis of just those files intercepted by data appliance 102 and sent to security platform 122 by data appliance 102, and can also cover signatures of malware known to security platform 122.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
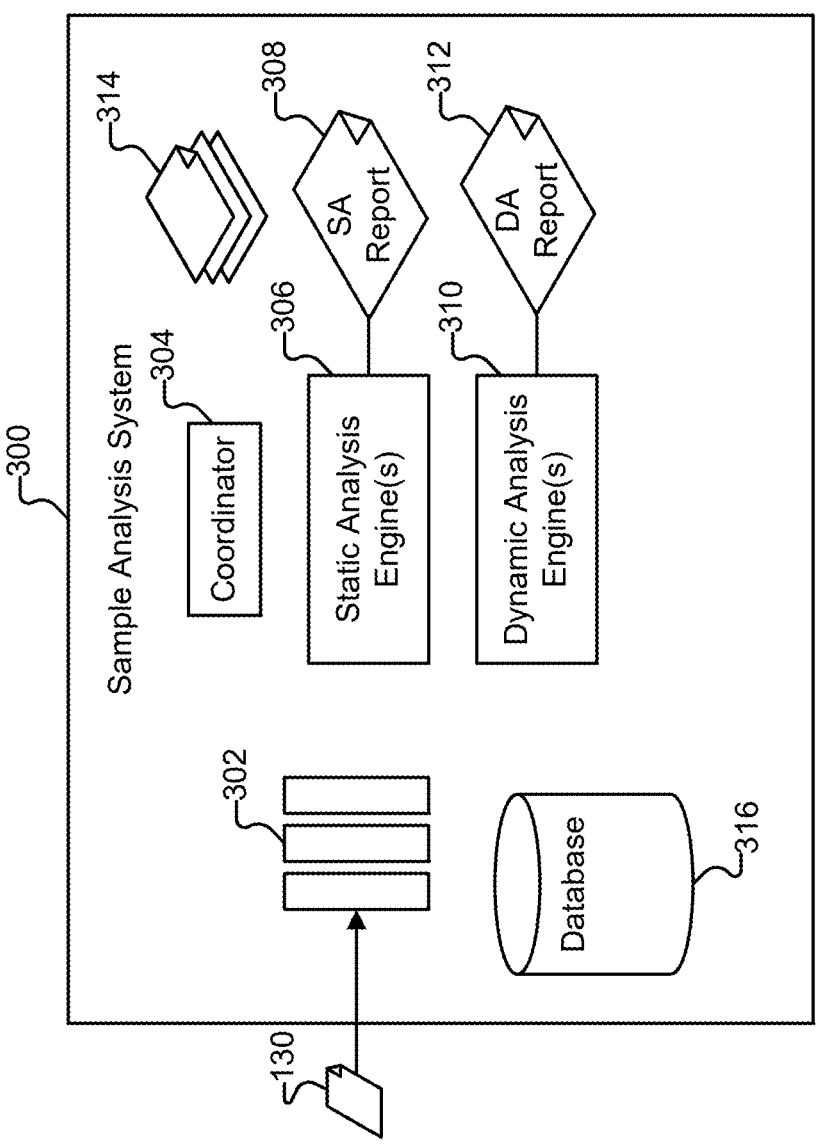
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (e.g., collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

The disclosed techniques for detecting MitM phishing attacks will now be further described below with respect to various system embodiments.

Prevention Of Man-in-the-Middle (MitM) Phishing

Figure 4A:
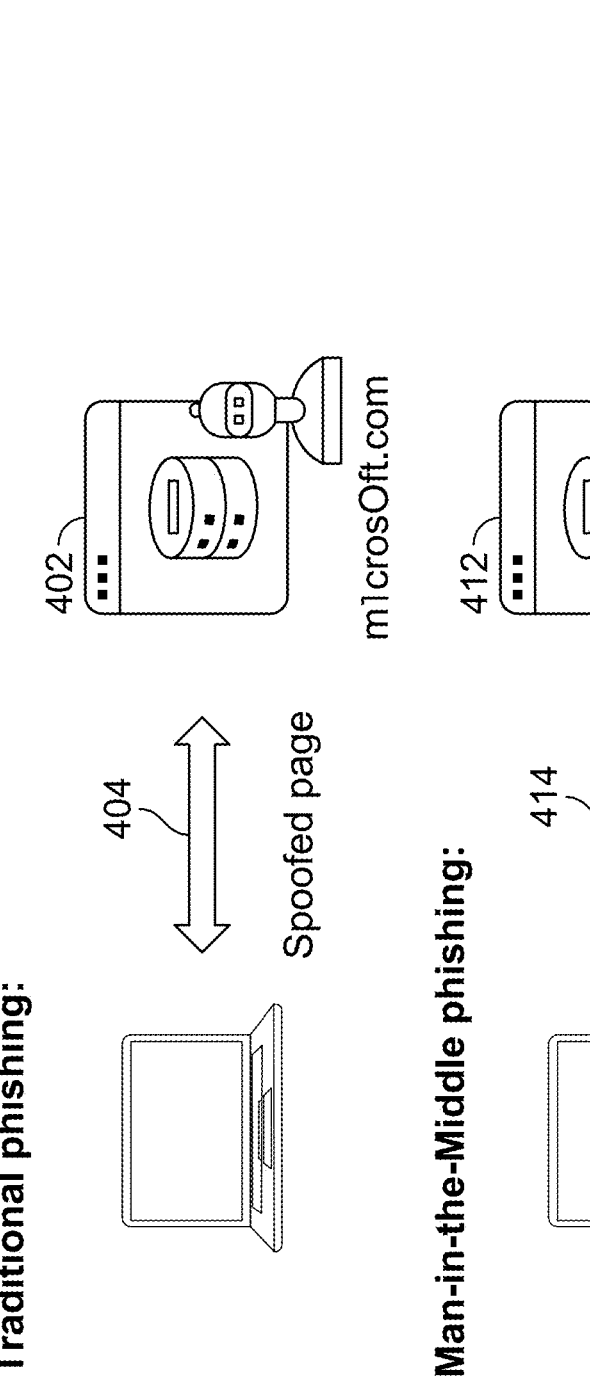
FIG. 4A illustrates traditional phishing as compared with a man-in-the-middle (MitM) phishing.

FIG. 4A illustrates traditional phishing as compared with a man-in-the-middle (MitM) phishing. Referring to FIG. 4A, which is a MitM related prior art figure that is publicly available at https://catching-transparent-phish.github.io/, a traditional phishing attack is shown with a spoofed website 402 that returns a spoofed page 404 (e.g., the traditional phishing attacker attempts to create a replica of the legitimate page, such as to spoof a web page associated with the actual, legitimate site for a brand, such as microsoft.com) to a user. Both traditional and MitM phishing attackers use a link that triggers the phishing attack (e.g., a link for M1ros0ft.com as shown in in FIG. 4A). However, MitM phishing pages are different from traditional phishing pages, because they do not host any actual phishing content of their own. Rather, a MitM phishing attack relays content, such as an original page 414, from the legitimate website (e.g., microsoft.com) as shown at 410 of FIG. 4A to the victim user (e.g., the MitM phishing attacker server does not host any content but rather is a de facto reverse proxy server as it acts as a proxy/relay of the website content, page(s), from the targeted site to the user as shown in FIG. 4A), and the MitM phishing attacker can intercept any credentials sent along the way via its proxy as shown at 412. Given that the content of the MitM phishing page is exactly the same as the content of the legitimate page (e.g., there are no artifacts that reveal differences as is typically the case between a spoofed page and the actual page for a legitimate website, such as different fonts, images, missing functionality, etc.), it is technically challenging to use existing content-based approaches to detect MitM phishing pages as similarly discussed above. As a final step of a MitM attack, the MitM server can capture the session cookie that allows access to a compromised account (e.g., after potentially performing two factor authentication (2FA)).

Figure 4B:
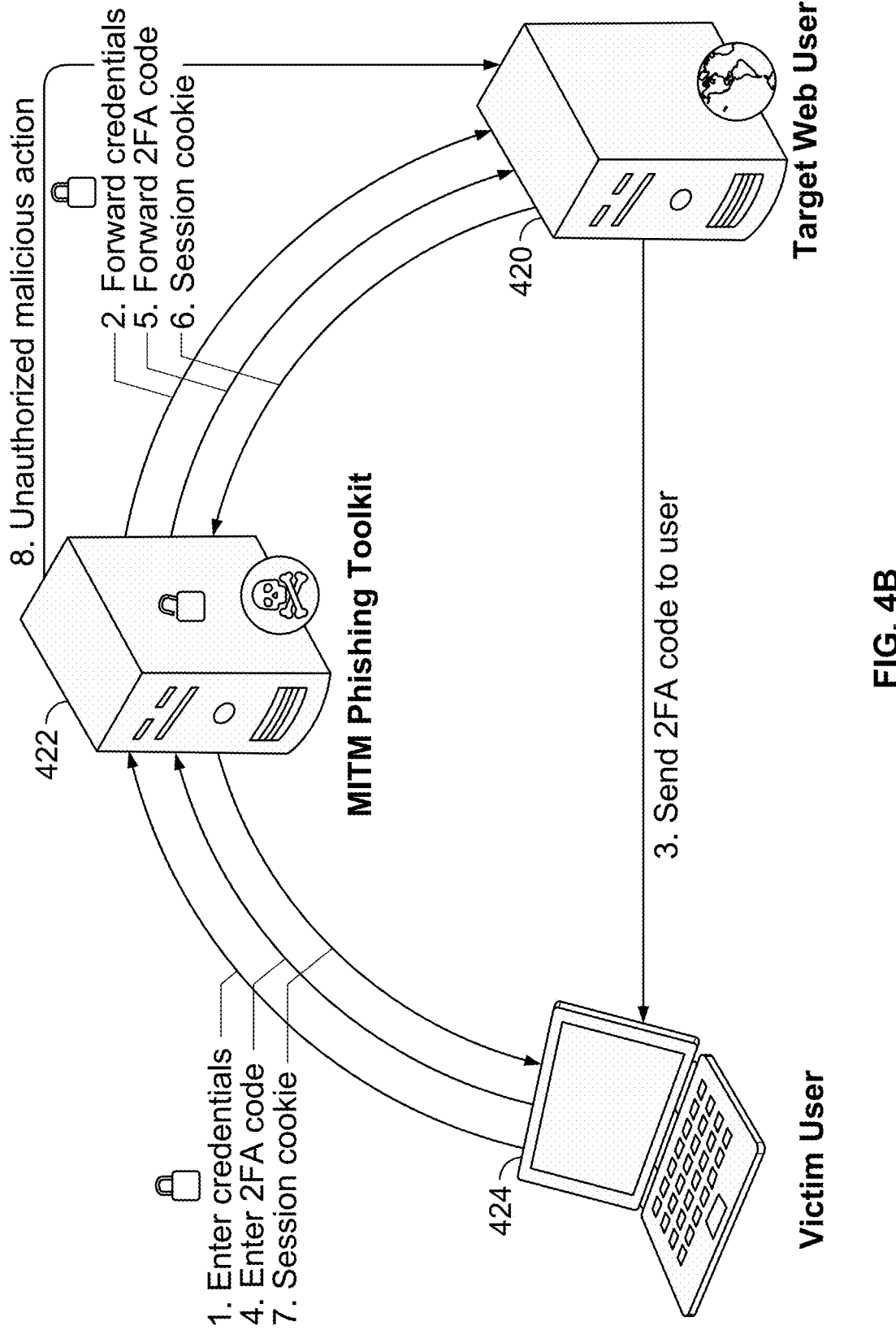
FIG. 4B illustrates a step-by-step process of a MitM phishing attack.

FIG. 4B illustrates a step-by-step process of a MitM phishing attack. As shown, a target web server 420 (e.g., github.com in this example) is targeted for a MitM phishing attack using a MitM phishing toolkit executed on a server 422 that acts as a proxy between the target web server and an endpoint device of a victim user as shown at 424. For example, the MitM server captures the session cookie, which facilitates access to the attacker to the account after the 2FA check is performed, and the MitM phishing server acts as a proxy between the victim user and a login page of the target website.

As such, MitM phishing attacks can also defeat two factor authentication for logging into the target website. For instance, assume that the victim user has configured two factor authentication for their login profile for the target website. When the user clicks on the phishing link for the target website generated by the MitM phishing toolkit and sent to the user, that link will return the login page for the MitM phishing page by passing the actual login page for the target website from the target web server to the victim user via the MitM phishing server shown at 422. The user enters the credentials, which are returned to the MitM phishing server (1), and the credentials are then forwarded from the MitM phishing server to the target web server (2). The target web server then initiates a two factor authentication that is sent directly to the user (3) (e.g., a text or email that includes a passcode for the user to enter as their two factor authentication (2FA) credentials into a web page to verify their identity). The entered credentials are then sent from the user's endpoint device to the MitM phishing server (4), and then from the MitM server relayed to the target web server (5) with the MitM phishing server acting as a relay (e.g., a proxy server). Finally, the target web server verifies the victim user's credentials to authenticate the user and returns a session cookie that is sent from the target web server to the MitM server (6), which then forwards the session cookie from the MitM server to the victim user's endpoint device (7) (e.g., their web browser executed on the endpoint device) as shown in FIG. 4B. It is not known to the target web server that the session cookie is actually first being sent to the MitM server, which now has access to the authenticated session cookie. As such, the MitM attacker can now utilize the authenticated session cookie to access the victim user's account on the target web server to perform potentially malicious and/or undesirable activities, such as attempting to gain access to other accounts or scanning other users, etc. (e.g., at least until that session cookie expires).

FIG. 4C illustrates an example MitM phishing kit dashboard. There exists several MitM phishing kits that are publicly available (e.g., EvilGinx released in 2017 that includes, for example, cloaking via the use of one-time links, EvilProxy released in 2022, etc.), which allow attackers to easily generate such MitM phishing attacks on a targeted brand (e.g., targeting multiple brands (phishlets), such as GitHub, Microsoft, and/or other brands with online presence/websites, such as banks, online stores, etc.) and which can also generally auto-create TLS certificates for their MitM phishing servers. Referring to FIG. 4C, EvilProxy basically provides a MitM phishing service platform for attackers to utilize (e.g., for a financial fee) for their MitM phishing campaigns to target multiple brands (e.g., Dropbox, Yahoo, Microsoft, etc.) as shown.

Figure 5:
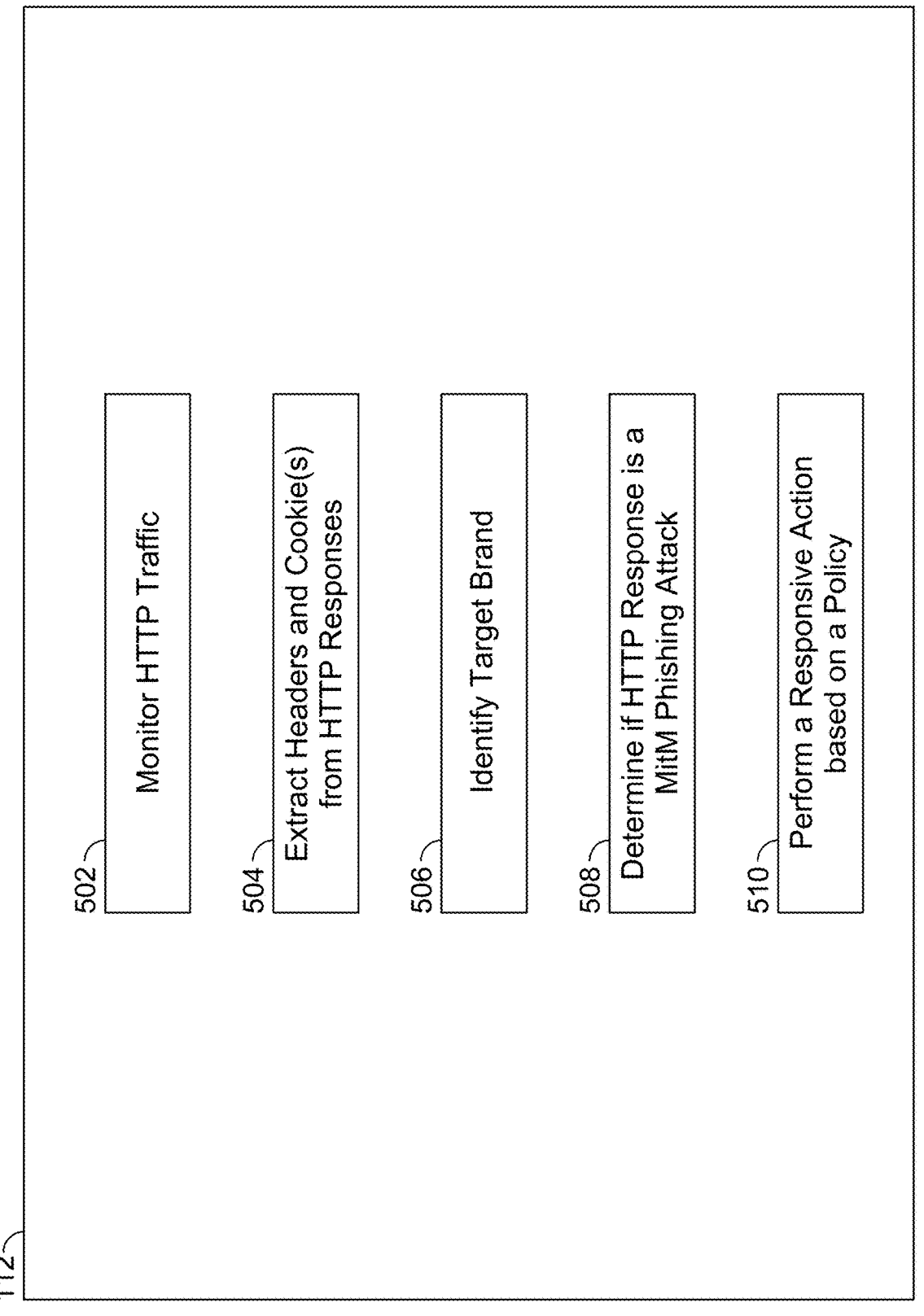
FIG. 5 illustrates a component diagram for performing inline detection of MitM attacks in accordance with some embodiments.

FIG. 5 illustrates a component diagram for performing inline detection of MitM attacks in accordance with some embodiments. In an example implementation, the MitM phishing detection logic components shown in FIG. 5 can be implemented in the malware analysis module 112 of a security platform shown as a data appliance (e.g., as shown at 102 in FIG. 1).

Referring to FIG. 5, the malware analysis module includes a component for monitoring (e.g., and parsing) HTTP traffic as shown at 502. The malware analysis module also includes another component for extracting headers and cookies from HTTP responses as shown at 504. In this example implementation, the HTTP response headers are automatically analyzed to detect a man-in-the-middle (MitM) phishing attack. As similarly described above, detecting a MitM phishing attack can be performed using a two stage approach (e.g., two stage MitM phishing detection logic illustrated in FIG. 5), which can be implemented using a security platform (e.g., a firewall, such as a Network Gateway Firewall (NGFW), or another form of security platform, such as shown as data appliance 102 in FIG. 1) to provide inline detection of MitM phishing attacks using the techniques disclosed herein.

Referring to the first stage, MitM phishing detection logic component 506 is configured to monitor the headers and cookie names being set in an HTTP response to identify a target brand (e.g., GitHub or another brand that has a website that may be targeted by MitM attackers). Specifically, in this first stage, we are attempting to determine the following: if this were a MitM phishing page (e.g., web page), what brand would it be targeting. For example, if the cookies that are set include "_device_id," "_octo," and "_gh_sess," and there is a special header called "x-github-request-id," then it can be automatically determined that the target brand of the potential MitM phishing attack is GitHub.

Referring to the second stage, after identifying the target brand, another component 508 is configured to perform further investigation on the HTTP headers to determine whether the HTTP response is associated with a legitimate page or a MitM phishing page. As a first check, the "Set-Cookie" header is analyzed to verify that it is set to the legitimate domain for the target brand (e.g., in this example, ".github.com"). As a second check, the security-related HTTP headers are analyzed to ensure that they are properly set (e.g., Strict-Transport-Security and Content-Security-Policy settings verification). The second check can further include verifying that the request URL domain is legitimate (e.g., in this example, "github.com") as well as the "Server" header indicates the Web server the legitimate site uses.

In an example implementation, the disclosed techniques for prevention of MitM phishing can further include the use of additional signals, such as the reputation of the destination domain and destination IP, and/or the age of the destination domain. As another example, additional signals can be used as a prefilter for triggering the disclosed inline MitM analysis.

It has been observed, based on our experiments, that for security reasons, legitimate applications (e.g., pages/websites) generally use a set of security-related headers to protect their content-loading and prevent cross-site scripting, etc. However, MitM attackers typically remove those headers so the page can load successfully on the illegitimate domain.

As such, in this example implementation, if the domain is not legitimate, and the security-related headers are not set, then the security platform can automatically determine that the HTTP response is associated with a MitM phishing attack.

Specifically, in this example implementation, the two stage logic as described above can be effectively and efficiently deployed in an inline phishing detection solution, such as Advanced Uniform Resource Link (URL) filtering (e.g., implemented in a security platform, such as an NGFW/data appliance, such as shown at 102 in FIG. 1).

As such, if the two stage MitM phishing detection logic is triggered, then another component 510 can be configured to (e.g., based on a security policy, such as MitM phishing detection rules/policies) block such MitM phishing pages/websites in, for example, real-time, such as before such MitM phishing pages/websites can load in a victim user's browser (e.g., web browser executed on the victim user's endpoint device, such as a smart phone, laptop computer, etc.).

FIGS. 6A and 6B illustrate an example use case for applying inline detection of MitM attacks in accordance with some embodiments.

Specifically, FIG. 6A illustrates a legitimate payload in an HTTP response from github.com. As further described below, the attributes associated with the payload in this HTTP response indicate that it is a legitimate payload for the github.com website.

There are a few indicators here that this HTTP response payload is benign. For example, the domain is actually set to github.com, which is what would be expected in an HTTP response from that website. In addition, there are several content related headers that are properly set as well (e.g., indicating a strict content security policy typically associated with a legitimate HTTP response as compared with a MitM phishing relayed HTTP response).

In contrast, FIG. 6B illustrates a MitM phishing attack with a modified payload in an HTTP response from github.sqtest.com. Specifically, as shown in this HTTP response, the cookies, even though their names match the cookie names shown in FIG. 6A, in this example HTTP response, the domain for these cookies is not actually github.com but rather is shown as github.sqtest.com. As such, this indicates that this may likely be a MitM phishing attack using a MitM phishing server associated with github.sqtest.com as that is the domain that is set for these cookies. In addition, there are no security related headers (i.e., no properly set security headers) in this HTTP response example. As such, this example HTTP response can be determined to be associated with a MitM phishing attack using the two stage MitM phishing detection logic.

In this example implementation using the two stage MitM phishing detection logic, at the first stage, the brand is identified based on the extracted headers (e.g., customized headers, such as x-github-request-id as shown at 602 in FIG. 6A) and the extracted cookie names (e.g., device_id, _octo, logged_in, and _gh_sess as shown at 604 in FIG. 6A, which can be configured in heuristics/rules periodically generated by malware analysts or using machine learning (ML) tools, such as by learning the cookie names associated with a known brand, such as for gihub.com, including, for example, an LLM model that is prompted with legitimate and MitM phishing related HTTP response data) and whether the security related headers are properly set (e.g., configured in heuristics/rules periodically generated by malware analysts or using machine learning (ML) tools, such as by learning the improperly set security related headers, including, for example, an LLM model that is prompted with legitimate and MitM phishing related HTTP response data). At the second stage, whether the extracted attributes from the HTTP response are associated with a MitM phishing attack is determined.

As similarly described above, whether the security related headers are properly set can be determined. As another example, whether the cookie domain (i.e., request URL domain is legitimate as well as the "Server" header indicates the Web server the legitimate site uses) is legitimate can be determined (e.g., .github.com). If not (e.g., the security related headers are not properly set and the cookie is not associated with the legitimate domain for the identified brand), then it is determined that the HTTP response/session is associated with a MitM phishing attack, and a responsive action can be performed as similarly described above.

FIG. 7 illustrates training of a Large Language Model (LLM) for performing automated MitM phishing detection in accordance with some embodiments. Referring to FIG. 7, a prompt 702 is provided for instructing ChatGPT (e.g., a commercially available LLM from OpenAI and/or another LLM can similarly be used) to automatically identify brand indicators to facilitate performing of the two stage detection logic disclosed herein using automated ML techniques to more rapidly expand such MitM phishing detection coverage to other brands by automatically determining the relevant attributes that can be associated with such brands based on legitimate and illegitimate HTTP response training data. In addition, the disclosed LLM training techniques for MitM phishing detection can also facilitate periodic updating for such attributes associated with covered/protected brands. A response from the LLM in this example is provided as shown at 704.

Various process embodiments for prevention of MitM phishing will now be further described below.

Example Process Embodiments for Prevention of MitM Phishing

FIG. 8 is a flow diagram for prevention of MitM phishing in accordance with some embodiments. In some embodiments, a process as shown in FIG. 8 is performed by a security platform (e.g., a data appliance 102 using a malware analysis system 112, such as advanced URL filtering and/or other components), and techniques as similarly described above including the embodiments described above with respect to FIGS. 1-3, 5, and 6A-B.

At 802, monitoring a session is performed, in which the session includes a request to access a website, such as similarly described above with respect to FIGS. 5 and 6A-B. For example, an inline security platform can monitor session traffic including HTTP traffic. As another example, a web crawler could proactively crawl websites and store the HTTP headers for analysis to facilitate an offline detection for MitM phishing attacks using the disclosed techniques.

At 804, evaluating a payload associated with the request to access the website is performed using a MitM phishing profile to determine that the request to access the website matches at least in part the MitM phishing profile, such as similarly described above with respect to FIGS. 5 and 6A-B. For example, headers (e.g., security related header information) and cookies (e.g., session cookie information) can be extracted from the HTTP response. The extracted information can be used to determine a brand associated with the HTTP response as similarly described above. As also similarly described above, whether the HTTP security headers are properly set and whether the session cookies are associated with a legitimate domain for the identified brand can be determined as similarly described above.

At 806, a remedial action is performed in response to determining that the payload is associated with MitM phishing activity, such as similarly described above with respect to FIGS. 5 and 6A-B. For example, the HTTP response can be blocked, and a user can be alerted that a MitM phishing attack was detected, and/or other responsive actions can similarly be performed (e.g., logging, quarantining the endpoint device, adding a URL associated with the MitM server to a block list, etc.), such as similarly described above.

Figure 9:
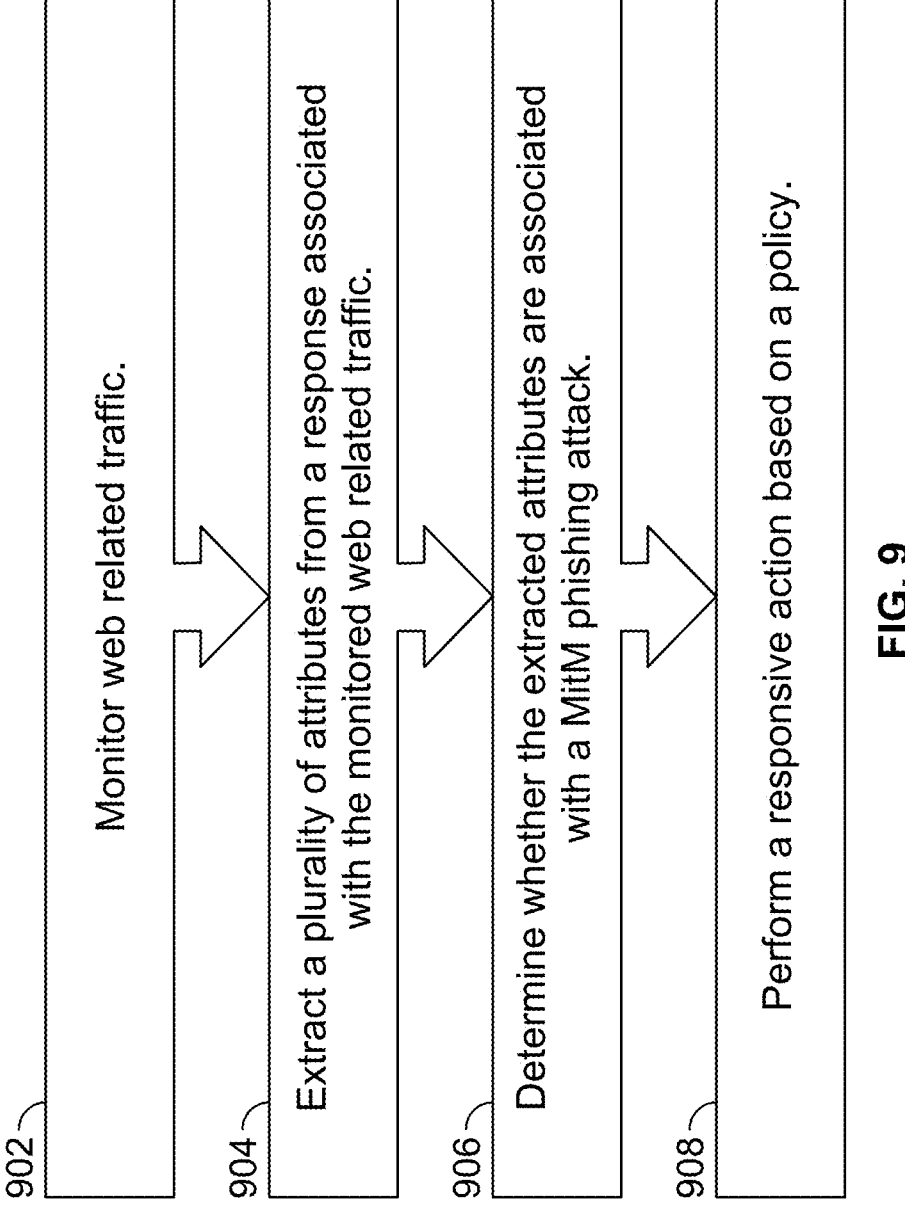
FIG. 9 is another flow diagram for prevention of MitM phishing in accordance with some embodiments.

FIG. 9 is another flow diagram for prevention of MitM phishing in accordance with some embodiments. In some embodiments, a process as shown in FIG. 9 is performed by a security platform (e.g., a data appliance 102 using a malware analysis system 112, such as advanced URL filtering and/or other components), and techniques as similarly described above including the embodiments described above with respect to FIGS. 1-3, 5, and 6A-B. The disclosed techniques for prevention of MitM phishing can be applied inline and/or offline.

At 902, monitoring web related traffic is performed as similarly described above with respect to FIGS. 5 and 6A-B. For example, an inline security platform can monitor session traffic including HTTP traffic. As another example, a web crawler could proactively crawl websites and store the HTTP headers for analysis to facilitate an offline detection for MitM phishing attacks using the disclosed techniques.

At 904, a plurality of attributes is extracted from a response associated with the monitored web related traffic as similarly described above with respect to FIGS. 5 and 6A-B. For example headers (e.g., security related header information) and cookies (e.g., session cookie information) can be extracted from the HTTP response. The extracted information can be used to determine a brand associated with the HTTP response as similarly described above.

At 906, determining whether the extracted attributes are associated with a MitM phishing attack is performed as similarly described above with respect to FIGS. 5 and 6A-B. For example, whether the HTTP security headers are properly set and whether the session cookies are associated with a legitimate domain for the identified brand can be determined as similarly described above.

At 908, a responsive action is performed based on a policy (e.g., a security policy, that includes a MitM phishing policy/rules as similarly described above with respect to FIGS. 5 and 6A-B. For example, the HTTP response can be blocked, and a user can be alerted that a MitM phishing attack was detected, and/or other responsive actions can similarly be performed (e.g., logging, quarantining the endpoint device, adding a URL associated with the MitM server to a block list, etc.), such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      monitor a session, wherein the session includes a request to access a website;
      evaluate a payload associated with the request to access the website using a Man in the Middle (MitM) phishing profile to determine that the request to access the website matches at least in part the MitM phishing profile, wherein a MitM phishing Uniform Resource Locator (URL) is extracted from the payload that was determined to be associated with the MitM phishing activity based on the MitM phishing profile, wherein the MitM phishing URL is added to a URL block list, wherein a machine learning model is used to generate the MitM phishing profile, and wherein the machine learning model includes a large language model (LLM), wherein the MitM phishing profile is periodically updated using the LLM, and wherein the evaluating of the payload comprises to:

extract a header and a cookie from an HyperText Transfer Protocol (HTTP) response associated with the website to identify a target brand; and after identifying the target brand, determine that the header and the cookie are associated with a MitM phishing page, comprising to:

verify that the cookie relates to a legitimate domain associated with the target brand;

determine that the header is properly set; and in response to a determination that the cookie relates to the legitimate domain associated with the target brand and the header is properly set, determine that the payload associated with the request to access the website matches at least in part the MitM phishing profile; and perform a remedial action in response to determining that the payload is associated with MitM phishing activity; and a memory coupled to the processor and configured to provide the processor with instructions.

2. The system of claim 1, wherein the remedial action includes blocking the request.

3. The system of claim 1, wherein performing the remedial action includes adding a Uniform Resource Locator (URL) associated with a detected MitM phishing server to a block list.

4. The system of claim 1, wherein performing the remedial action includes providing a verdict of MitM phishing to a data appliance.

5. A method, comprising:

monitoring a session, wherein the session includes a request to access a website;

evaluating a payload associated with the request to access the website using a Man in the Middle (MitM) phishing profile to determine that the request to access the website matches at least in part the MitM phishing profile, wherein a MitM phishing Uniform Resource Locator (URL) is extracted from the payload that was determined to be associated with the MitM phishing activity based on the MitM phishing profile, wherein the MitM phishing URL is added to a URL block list, wherein a machine learning model is used to generate the MitM phishing profile, and wherein the machine learning model includes a large language model (LLM), wherein the MitM phishing profile is periodically updated using the LLM, and wherein the evaluating of the payload comprises:

extracting a header and a cookie from an HyperText Transfer Protocol (HTTP) response associated with the website to identify a target brand; and after identifying the target brand, determining that the header and the cookie are associated with a MitM phishing page, comprising:

verifying that the cookie relates to a legitimate domain associated with the target brand;

determining that the header is properly set; and in response to a determination that the cookie relates to the legitimate domain associated with the target brand and the header is properly set, determining that the payload associated with the request to access the website matches at least in part the MitM phishing profile; and performing a remedial action in response to determining that the payload is associated with MitM phishing activity.

6. The method of claim 5, wherein the remedial action includes blocking the request.

7. A computer program product embodied in a non-transitory computer readable medium and comprising computer instructions for:

monitoring a session, wherein the session includes a request to access a website;

evaluating a payload associated with the request to access the website using a Man in the Middle (MitM) phishing profile to determine that the request to access the website matches at least in part the MitM phishing profile, wherein a MitM phishing Uniform Resource Locator (URL) is extracted from the payload that was determined to be associated with the MitM phishing activity based on the MitM phishing profile wherein the MitM phishing URL is added to a URL block list, wherein a machine learning model is used to generate the MitM phishing profile, and wherein the machine learning model includes a large language model (LLM), wherein the MitM phishing profile is periodically updated using the LLM, and wherein the evaluating of the payload comprises:

extracting a header and a cookie from an HyperText Transfer Protocol (HTTP) response associated with the website to identify a target brand; and after identifying the target brand, determining that the header and the cookie are associated with a MitM phishing page, comprising:

verifying that the cookie relates to a legitimate domain associated with the target brand;

determining that the header is properly set; and in response to a determination that the cookie relates to the legitimate domain associated with the target brand and the header is properly set, determining that the payload associated with the request to access the website matches at least in part the MitM phishing profile; and performing a remedial action in response to determining that the payload is associated with MitM phishing activity.

8. The computer program product of claim 7, wherein the remedial action includes blocking the request.

* * * * *